Oct. 24, 1939.   W. A. PURTELL   2,177,004
SCREW
Filed Dec. 30, 1937
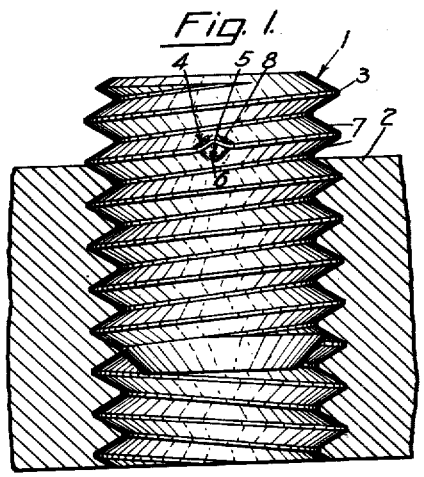
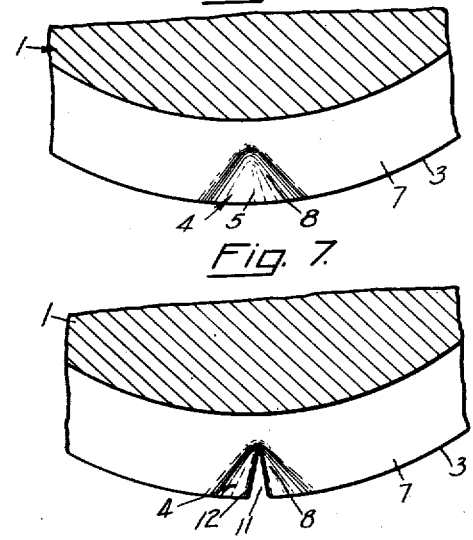
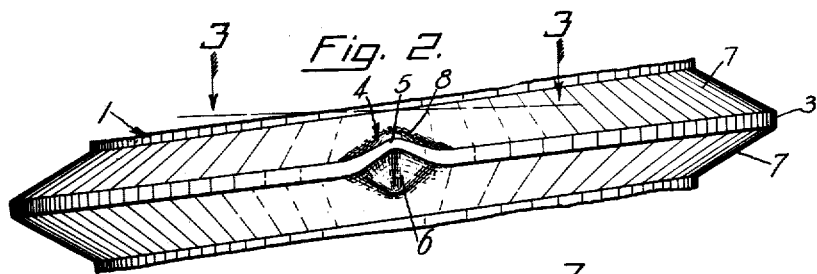
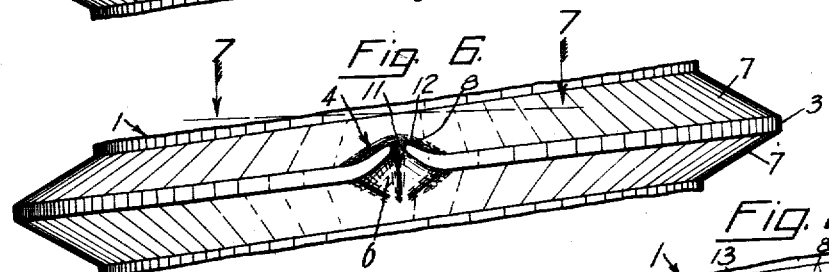
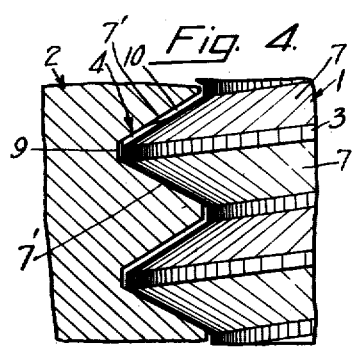
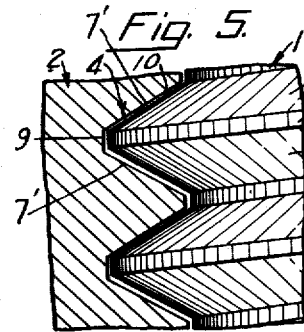
INVENTOR
William A. Purtell
By
ATTORNEY Patented Oct. 24, 1939

2,177,004

UNITED STATES PATENT OFFICE 2,177,004

SCREW

William A. Purtell, West Hartford, Conn.

Application December 30, 1937, Serial No. 182,554

10 Claims. (Cl. 151—22)

My invention relates to screws.

It has for its object to provide an improved screw, and, more particularly, an improved self locking screw. A further object of my invention is to provide such an improved screw having improved locking means formed in the thread whereby the screw is effectually prevented from loosening when threaded into a companion member. A still further object of my invention is to provide such improved locking means adapted to be readily and inexpensively provided upon the thread of the screw in such manner as to enable the latter to function satisfactorily as a self locking screw without materially increasing the cost thereof. These and other objects and advantages of my improved construction will, however, hereinafter more fully appear.

In the accompanying drawing, I have shown for purposes of illustration three embodiments which my invention may assume in practice.

In the drawing—

Figure 1 is a side view of a screw embodying the features of one form of my invention, the screw being shown partly inserted in a companion member illustrated in section;

Fig. 2 is an enlarged side elevation of the portion of the screw equipped with my improvement;

Fig. 3 is a sectional view on line 3—3 of Figure 2, showing a top plan view of the locking portion;

Fig. 4 is a detail view similar to Figure 1, but showing only a portion of the screw threaded into the companion member, the parts being in the position occupied when the screw is being inserted;

Fig. 5 is a view similar to Figure 4, but showing the position of the parts after resistance is encountered by the screw;

Fig. 6 is a view similar to Figure 2, but showing a modified construction;

Fig. 7 is a sectional view similar to Figure 3, the section being taken on line 7—7 of Figure 6, and Fig. 8 is a detail view similar to that shown in Figure 6, but showing a further modified construction.

Referring first to the illustrative construction shown in Figures 1 to 5, it will be noted that I have therein illustrated a screw 1, herein a socketed set screw, threaded into a companion threaded member 2; the screw 1 being provided with my improved self locking means, as hereinafter described.

Referring more particularly to Figure 2, it will be noted that the crest 3 of the thread on the screw 1 is deformed upwardly as at 4 at a point adjacent the upper end of the screw, the crest on opposite sides of the deformation and on the remainder of the thread being of normal or standard form, as shown. Herein, the deformation is at its outer edge substantially of the shape of an inverted V, the edge portions of the V herein including angularly displaced and related portions of the crest connected at their apex by and sloping away from a rounded connecting portion or ridge 5 which extends inwardly above a portion of the upper side face 7 of the thread. Further, it will be noted that under this deformation 4, a depression 6 is formed in the under side face 7 of the thread, this depression at the top conforming in general to the shape of the deformation 4 and also extending below the crest 3, part way down the under side face 7. Above the portion 4, a raised portion 8 is thus formed on the upper side face 7 of the thread, having a middle slightly upwardly inclined ridge 5 and sloping opposite sides and corresponding generally in shape to the portion 4 while tapering inwardly to a point nearer the root of the thread. In this construction, however, as in a preferred construction, neither the depression 6 nor the raised portion 8 extends over its face 7 to the root of the thread, each being spaced substantially therefrom.

As a result of this construction, it will be observed that the only deformation 4 is on the upper side face of the thread. Thus, as the screw 1 is threaded into the member 2, the screw 1 will turn quite freely in the companion thread in the member 2, the bottom side face 7 of the screw 1 then running close to the corresponding side face 7' of the standard female thread 9 on the member 2, in such manner as to produce a usual top clearance space 10 above the upper side face 7 on the deformed thread as shown in Figure 4. As a result of this clearance and the rotation of the portion 4 therein during threading in of the screw, the resistance to the insertion of the screw 1 in the member 2 will be substantially negligible. On the contrary, however, when the set screw 1 encounters resistance, as when it bottoms in the hole, i. e., engages a member to be positioned thereby, the effect of this resistance is to cause the lower side face 7 of the thread on the screw 1 to move away from a companion face 7' on the female thread (see Fig. 5), and similarly to cause the upper side face 7 on the screw 1 to move toward the upper side face 7' on the female thread. As a result, the deformed portion 4 is then pressed against the upper face 7' of the female thread in such manner as to cause the portion 4 to bind very effectively against this upper face 7', the portion 4 then being compressed somewhat and also being embedded somewhat in the face 7' of the female thread. Thus, it will be evident that any tendency of the screw 1 to be loosened, as by vibration or the like, is effectually prevented, due not only to the engagement of the upper face of the deformed portion 4 with the upper face 7' of the female thread and consequent binding, but also to the resultant binding between the other threads on the members 1 and 2; all in such manner as very securely to position the member 1 in the desired position in the member 2. However, it will be noted that due to the shape of the upper face of the portion 4 including the rounded upper surface 5 thereon, it is still possible to remove the member 1 by reverse rotation thereof when desired, the member 4 then being released from compression and moving out in the clearance 10 again provided when the screw is moved reversely.

In Figures 6, 7 and 8, I have illustrated different forms of a modified construction which, while not preferred, may be used if desired. This construction is essentially similar to that heretofore described, save that in this construction the deformed portion 4 is provided with a slot or opening 11 in its top. Herein, this slot is V-shaped and extends inward throughout the depth of the portion 8, gradually narrowing to a point at its inner end, as shown in Figure 7. In a preferred form, the edges 12 of this slot are also rounded, as shown in Figures 6 and 7, and so disposed that each acts to shield the other; the tendency of these edges 12 to dig into the side face 7' of the female thread being thus minimized. However, as shown in Figure 8, these edges may be sharp, if desired, as shown at 13. Obviously, the construction described in Figures 6, 7 and 8 will function generally similarly to that heretofore described, although in this construction it will be observed that the severed edge portions on opposite sides of the slot provide portions having a greater tendency to dig into the female side face 7' and consequently will offer greater difficulty to insertion or removal of the screw when desired, while also necessarily cutting or scarring up the female thread substantially more in the process of insertion or removal.

As a result of my improved construction, it will be evident that, due to the sloping sides of the deformation 4, it is possible to minimize the resistance to the entry of the external thread into the internal thread, only a small portion of the deformation 4 having to exceed the normal clearance between the threads. Also as a result of my improved locking means by which the deformation of the thread is confined to the more resilient crest portion of the thread of an otherwise normal screw thread, no deformation of the companion thread takes place when the latter is engaged by the deformed crest of the set screw. Instead, the more resilient deformed crest portion of the set screw engages the stronger root, or base, portion of the companion thread which resists deformation while providing the desired cramping action to prevent loosening of the screw. Also, by confining the deformation to the crest portion, a construction is provided which is ready to use without requiring special tools to effect the locking action after tightening the screw. Further, it is possible to deform the thread quickly and inexpensively without, in any way, materially increasing the cost of the screw. My improvement being adapted to be applied to any standard screw after completion thereof, it will also be observed that all need for special formation of the thread of either the screw or companion member during manufacture is eliminated, in such manner as thereby further to minimize the cost of production. Attention is also particularly directed to the fact that my improved construction makes it possible to take advantage of the clearance present during insertion of the screw, in such manner as thereby to minimize the resistance to the threading-in of the latter, while also providing a simple yet effective means for preventing loosening of the screw; the deformed portion tending to bind effectively and thrust the screw laterally upon the latter encountering resistance and thus effectively resisting a reverse movement thereof. Nevertheless, it will be evident that in the preferred form of my invention, the screw 1 may be threaded out of the member 2 whenever desired without substantial injury to the thread in the latter, or undue resistance; this being due to the shape of the upper surface of the deformed portion, whereby, although effectual holding is made possible, objectionable mutilation of the side faces of the female threads is eliminated. It will be understood that I contemplate the use of a resilient deformed portion and that I may use heat treated screws and that I may also use the same with companion members of like or harder or softer material. These and other advantages of my improved construction will, however, be clearly apparent to those skilled in the art.

While I have in this application specifically described three forms which my invention may assume in practice, it will be understood that these forms are shown for purposes of illustration and that the same may be modified and embodied in various other forms without departing from its spirit or the scope of the appended claims.

What I claim as new and desire to secure by Letters Patent is:

1. A self locking screw having a thread and having, prior to connection to a cooperating member, means for locking said thread to a standard thread of the cooperating member operative to lock upon relative rotation of said screw and member and comprising a deformation in the crest portion only of said thread of gradually increasing height extending laterally relative to and on one side of the normal line of the crest in an intermediate portion of said first mentioned thread between normal portions of the latter.

2. A self locking screw having a thread including a locking turn having a continuous base, and also having on said turn, prior to connection to a cooperating member, means for locking said thread to a standard thread of the cooperating member and comprising means on the crest portion only of said turn and wholly above the adjacent portions of the upper side face thereof movable in the clearance above said face during threading in of said screw without deformation of the female thread and binding against the side face of said female thread when the screw encounters resistance.

3. A self locking screw including a continuous locking turn of thread having a normal base free from offsets in profile and having, prior to connection to a cooperating member, means for locking said thread to a standard thread of the cooperating member and comprising on said normal base an upwardly sloping portion of the crest only of said locking turn of thread movable in the clearance above said face during threading in of said screw without deformation of the female thread and binding against the side face of said female thread when the screw encounters resistance.

4. A self locking screw having a thread and having, prior to connection to a cooperating member, means for locking said thread to a standard thread of the cooperating member operative to lock upon relative rotation of said screw and member and comprising an upward deformation of a portion of the crest only thereof between adjacent portions of said crest of said thread of standard form, said deformation being on the upper side face of the thread and comprising oppositely sloping portions of the crest united at the top.

5. A locking screw having a thread and having, prior to connection to a cooperating member, means for locking said thread to a standard thread of the cooperating member operative to lock upon relative rotation of said screw and member and comprising an upward deformation of a portion of the crest of said thread thereof between adjacent portions of said crest of standard form, said deformation being on the upper side face of the thread and comprising oppositely sloping portions of the crest spaced apart at the top and having adjacent rounded edges.

6. A locking screw having a thread and having, prior to connection to a cooperating member, means for locking said thread to a standard thread of the cooperating member operative to lock upon relative rotation of said screw and member and comprising an upward deformation of a portion of the crest of said thread thereof between adjacent portions of said crest of standard form, said deformation being on the upper side face of the thread and comprising oppositely sloping portions of the crest spaced apart at the top and having adjacent sharp edges.

7. A self locking screw having a thread including a crest having spaced normal portions and having, prior to connection to a cooperating member, means for locking said thread to a standard thread of the cooperating member operative to lock upon relative rotation of said screw and member and comprising an upward resiliently tempered deformation of an intermediate portion of said crest only of gradually increasing height between said normal portions.

8. A self locking screw including a locking turn of thread having a base free from offsets in profile and having, prior to connection to a cooperating member, means for locking said thread to a standard thread of the cooperating member operative to lock upon relative rotation of said screw and member and comprising a laterally extending oppositely sloping deformation of the crest extending inwardly toward the undeformed base thereof, said deformation being disposed between normal portions of said turn of thread and also having a depression below said deformation.

9. A self locking screw including a locking turn of thread having a base free from offsets in profile and having, prior to connection to a cooperating member, means for locking said thread to a standard thread of the cooperating member operative to lock upon relative rotation of said screw and member and comprising an upward resilient deformation of a portion of the crest only of said thread thereof between adjacent portions of said crest of standard form, said deformation being on the upper side face of the thread and comprising oppositely sloping portions of the crest.

10. A self locking screw including a locking turn of thread having a base free from offsets in profile and having, prior to connection to a cooperating member, means for locking said thread to a standard thread of the cooperating member operative to lock upon relative rotation of said screw and member and comprising an upward deformation of a portion of the crest only of said locking turn of thread between adjacent portions of said crest of standard form, said deformation being in the form of a raised portion on the upper side face of the thread and comprising oppositely sloping portions of the crest spaced apart at the top.

WILLIAM A. PURTELL.

---

CERTIFICATE OF CORRECTION.

Patent No. 2,177,004.            October 24, 1939.

WILLIAM A. PURTELL.

It is hereby certified that error appears in the printed specification of the above numbered patent requiring correction as follows: Page 3, first column, lines 18 and 19, claim 4, strike out the words "of said thread" and insert the same after "only" in line 17, same claim; and that the said Letters Patent should be read with this correction therein that the same may conform to the record of the case in the Patent Office.

Signed and sealed this 2nd day of January, A. D. 1940.

(Seal)                                   Henry Van Arsdale,
                                         Acting Commissioner of Patents.

nection to a cooperating member, means for locking said thread to a standard thread of the cooperating member and comprising on said normal base an upwardly sloping portion of the crest only of said locking turn of thread movable in the clearance above said face during threading in of said screw without deformation of the female thread and binding against the side face of said female thread when the screw encounters resistance.

4. A self locking screw having a thread and having, prior to connection to a cooperating member, means for locking said thread to a standard thread of the cooperating member operative to lock upon relative rotation of said screw and member and comprising an upward deformation of a portion of the crest only thereof between adjacent portions of said crest of said thread of standard form, said deformation being on the upper side face of the thread and comprising oppositely sloping portions of the crest united at the top.

5. A locking screw having a thread and having, prior to connection to a cooperating member, means for locking said thread to a standard thread of the cooperating member operative to lock upon relative rotation of said screw and member and comprising an upward deformation of a portion of the crest of said thread thereof between adjacent portions of said crest of standard form, said deformation being on the upper side face of the thread and comprising oppositely sloping portions of the crest spaced apart at the top and having adjacent rounded edges.

6. A locking screw having a thread and having, prior to connection to a cooperating member, means for locking said thread to a standard thread of the cooperating member operative to lock upon relative rotation of said screw and member and comprising an upward deformation of a portion of the crest of said thread thereof between adjacent portions of said crest of standard form, said deformation being on the upper side face of the thread and comprising oppositely sloping portions of the crest spaced apart at the top and having adjacent sharp edges.

7. A self locking screw having a thread including a crest having spaced normal portions and having, prior to connection to a cooperating member, means for locking said thread to a standard thread of the cooperating member operative to lock upon relative rotation of said screw and member and comprising an upward resiliently tempered deformation of an intermediate portion of said crest only of gradually increasing height between said normal portions.

8. A self locking screw including a locking turn of thread having a base free from offsets in profile and having, prior to connection to a cooperating member, means for locking said thread to a standard thread of the cooperating member operative to lock upon relative rotation of said screw and member and comprising a laterally extending oppositely sloping deformation of the crest extending inwardly toward the undeformed base thereof, said deformation being disposed between normal portions of said turn of thread and also having a depression below said deformation.

9. A self locking screw including a locking turn of thread having a base free from offsets in profile and having, prior to connection to a cooperating member, means for locking said thread to a standard thread of the cooperating member operative to lock upon relative rotation of said screw and member and comprising an upward resilient deformation of a portion of the crest only of said thread thereof between adjacent portions of said crest of standard form, said deformation being on the upper side face of the thread and comprising oppositely sloping portions of the crest.

10. A self locking screw including a locking turn of thread having a base free from offsets in profile and having, prior to connection to a cooperating member, means for locking said thread to a standard thread of the cooperating member operative to lock upon relative rotation of said screw and member and comprising an upward deformation of a portion of the crest only of said locking turn of thread between adjacent portions of said crest of standard form, said deformation being in the form of a raised portion on the upper side face of the thread and comprising oppositely sloping portions of the crest spaced apart at the top.

WILLIAM A. PURTELL.

CERTIFICATE OF CORRECTION.

Patent No. 2,177,004.  October 24, 1939.

WILLIAM A. PURTELL.

It is hereby certified that error appears in the printed specification of the above numbered patent requiring correction as follows: Page 3, first column, lines 18 and 19, claim 4, strike out the words "of said thread" and insert the same after "only" in line 17, same claim; and that the said Letters Patent should be read with this correction therein that the same may conform to the record of the case in the Patent Office.

Signed and sealed this 2nd day of January, A. D. 1940.

(Seal)

Henry Van Arsdale,
Acting Commissioner of Patents.